United States Patent [19]
Firstenberg

[11] 3,939,930
[45] Feb. 24, 1976

[54] VEHICLE TRACK RETENTION DEVICE
[76] Inventor: Harold S. Firstenberg, 131 Townsend St., San Francisco, Calif. 94101
[22] Filed: Sept. 3, 1974
[21] Appl. No.: 502,519

Related U.S. Application Data
[63] Continuation-in-part of Ser. No. 372,220, June 21, 1973, Pat. No. 3,860,080.

[52] U.S. Cl. .................................. 180/5 A; 305/24
[51] Int. Cl.² .......................................... B62D 55/04
[58] Field of Search .......... 180/9.26, 9.28, 5 R, 5 A; 305/20–25, 28, 29, 56, 16, 27

[56] References Cited
UNITED STATES PATENTS

| | | | |
|---|---|---|---|
| 2,423,544 | 7/1947 | Acton | 180/5 A |
| 3,074,499 | 1/1963 | Bertelsen | 305/24 |
| 3,554,310 | 1/1971 | Dieffenbach | 305/25 |
| 3,737,001 | 6/1973 | Rasenberger | 180/5 A |

*Primary Examiner*—Philip Goodman
*Attorney, Agent, or Firm*—Julian Caplan

[57] ABSTRACT

A track-carrying frame is attached to a vehicle axle, preferably as a temporary replacement for the vehicle wheel, as is disclosed in application Ser. No. 413,443, filed Nov. 7, 1973 now U.S. Pat. No. 3,834,771. The present device comprises a track guide attached to the bottom of the frame which cooperates with lugs on the inner faces of the track to prevent the track from moving laterally off the frame and the sprockets, idlers and bogie wheels mounted thereon. Further, the device restrains the frame from movement relative to the vehicle from its normal horizontal position into an inoperative position when the frame momentarily is out of contact with the ground.

13 Claims, 7 Drawing Figures

U.S. Patent  Feb. 24, 1976  3,939,930
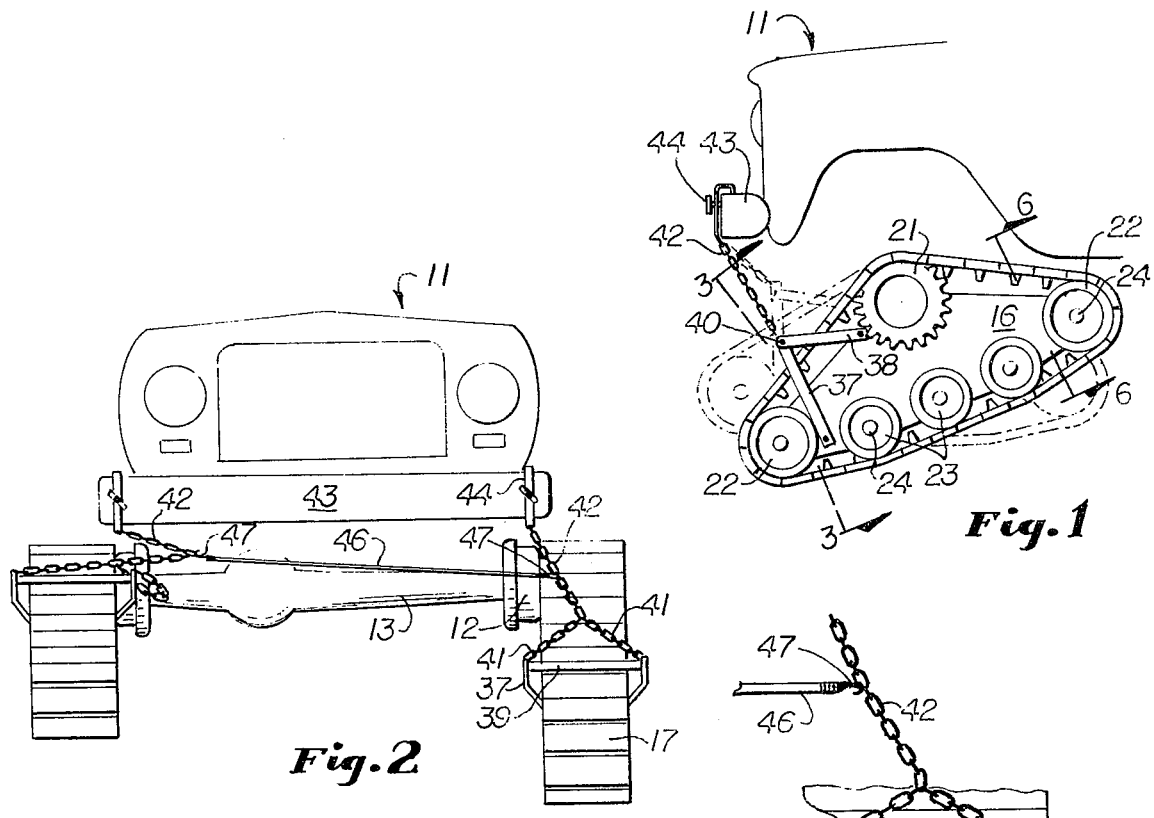
Fig. 1
Fig. 2
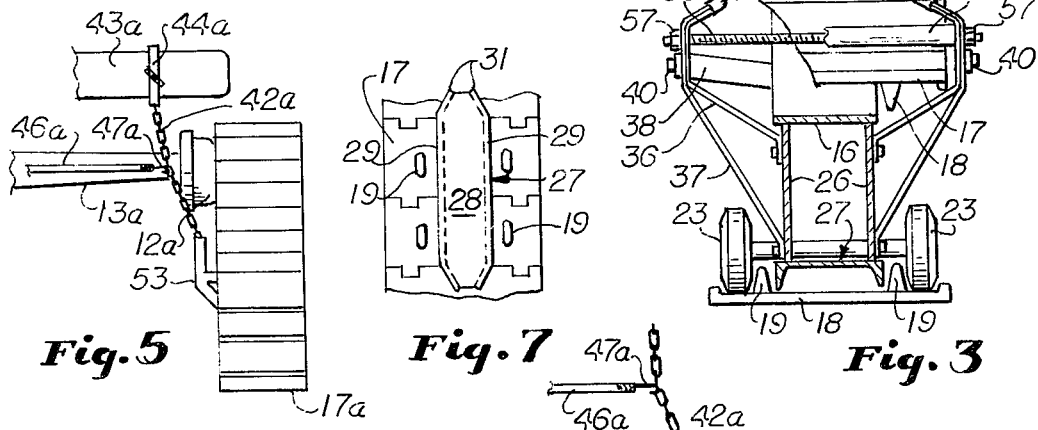
Fig. 5
Fig. 7
Fig. 3
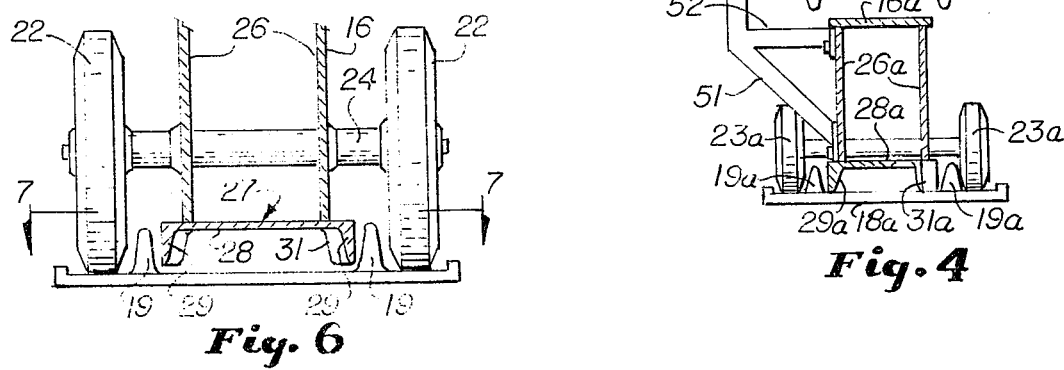
Fig. 6
Fig. 4

VEHICLE TRACK RETENTION DEVICE

This application is a continuation-in-part of co-pending application, Ser. No. 372,220, filed June 21, 1973 now U.S. Pat. No. 3,860,080.

This invention relates to a new and improved vehicle track retention device.

One of the principal objects of the present invention is to provide means to prevent the track from coming off the supports thereof in a structure such as shown in co-pending application Ser. No. 413,443, filed Nov. 7, 1973. The present invention provides a means for resisting lateral forces which tend to disengage the endless track from its drive system. Such forces are encountered when the vehicle on which the device is installed is operating on a relatively steep hillside or when the vehicle encounters obstruction such as rocks, logs, etc., which tend to unseat the endless track from the drive sprockets, idlers, and bogie wheels which normally hold the track in proper position on the supporting frame.

Another feature of the invention is the provision of means for strengthening the frame by bridging the opening which otherwise exists at the lower ends of the plates which make up a substantial portion of the frame.

Another purpose of the invention is to provide means to prevent the frame from inverting from its normal position. It will be understood that when the vehicle passes over logs, deep holes or encounters a steep hillside there is an absence of support for the forward ends of the frames on which the endless tracks are mounted. Under such conditions, there is a tendency for the frame to rotate relative to the vehicle and even to invert from its normal ground engaging position because there is an absence of support for the forward end of the frame and hence the frame tends to turn about its drive axis in the direction of rotation of the track.

A principal purpose of the present invention is to resist such turning force.

Another feature of the invention is the fact that means are provided to attach the frame by means of chains, cable and other means to a stationary portion of a vehicle such as a bumper and thus prevent rotation or inversion of the track frame.

Still another feature of the invention is the provision of means to hold the chains heretofore mentioned relatively taut so that they do not become snagged in the rotating portions of the structure.

Other objects of the present invention will become apparent upon reading the following specification and referring to the accompanying drawings in which similar characters of reference represent corresponding parts in each of the several views.

In the drawings:

FIG. 1 is a fragmentary, side elevational view showing the present device mounted on a vehicle and showing in dot-and-dash lines the normal position of the track frame and in solid lines a partially rotated position of said frame resisted by the device of the present invention.

FIG. 2 is a front, elevational view of the structure of FIG. 1.

FIG. 3 is an enlarged, sectional view taken substantially along the line 3—3 of FIG. 1.

FIG. 4 is a view similar to FIG. 3 of a modification.

FIG. 5 is a fragmentary view similar to FIG. 2 of the modification of FIG. 4.

FIG. 6 is an enlarged, sectional view taken substantially along the line 6—6 of FIG. 1.

FIG. 7 is a fragmentary, sectional view showing a portion of the structure of FIG. 6, taken substantially along the line 7—7 of FIG. 6.

The devices of the present invention are intended for mounting on a vehicle 11, which preferably has a four-wheel drive. The structure is mounted on each drive wall 12 at opposite ends of the axles 13 of said vehicle. Reference is made to co-pending application Ser. No. 413,443, filed Nov. 7, 1973, for one structure to which the present invention is adaptable, it being understood that the invention may be used with other similar structures.

A frame 16 is provided around which there travels a continuous track 17 made up of a plurality of track sections 18 pivoted together by pivot means (not shown). Each track section has a plurality of upstanding lugs 19 on its inside surface which function to help to keep the track 17 in place. Rotatably mounted in frame 16 are drive sprockets 21 at the upper angle of the substantially triangular frames 16, idler wheels 22 at each of the other angles of said frame and a plurality of bogie wheels 23, the wheels 22 and bogies 23 being suitably rotatably mounted in frame 16 by means of shafts 24.

Frame 16, in one form of the present invention, comprises two vertical parallel plates 26 each substantially triangular in side elevation as viewed in FIG. 1. The lower ends of plates 26 are normally horizontal. Fixed to the lower ends of plates 26 is an inverted channel 27, the web 28 thereof being welded to the lower edges of plates 26 and the flanges 29 being located immediately within the paths of travel of the lugs 19. As best shown in FIG. 6, the channel flanges 29 are immediately inside lugs 19 while the idler wheels 22 or bogie wheels 23 are immediately outside said lugs. Accordingly, any tendency of the track 17 to move laterally out of position is resisted by the flanges 29. In order to prevent the lugs 19 from striking against the flanges 29, at either end of channel 27 the flanges are severed from web 28 and curved inwardly in curved ends 31 (see FIG. 7). If there is any tendency for the lugs 19 to be out of line, the curved ends 31 guide the lugs into proper aligned relationship.

One structure for preventing the frame 16 from inverting or partially revolve is shown in FIGS. 1, 2 and 3. On either side of frame 16 immediately behind idler wheels 22 are inner and outer brackets 36, 37 which extend laterally of frame 26 and are joined by forwardly-upwardly slanted rear bracket 38, the rear end of which is attached to frame 16 on either side at approximately its midpoint. The brackets 36–38 are brought together and attached by a fastener 40 and the brackets or other means on either side of the frame are interconnected by a transverse cross tube 39 which is located immediately above the path of track 17. In a preferred form, as is best shown in FIG. 3, a threaded rod 56 inside tube 39 extends through holes in brackets 36–38 and the assembly is held together by cap nuts 57 on the ends of rod 56. Chain sections 41 are connected at their lower ends to the bracket structure heretofore described, and that their upper ends are connected to the lower end of chain 42. The upper end of chain 42 is connected to a stationary portion of the vehicle such as the bumper by a clamp 44.

When the frames 16 are in their normal position (dot-and-dash line of FIG. 1), the chains 41, 42 are slack and there is a danger that they may become caught in the track 17 or some other portion of the apparatus. Since there are devices installed on each side of the vehicle, a tightener cord 46 of elasticized material, or other tension means, interconnects chains 42 on either side by means of hooks 47 connected to opposite ends of cord 46.

In the modification of FIGS. 4 and 5, instead of a support being located on each side of frame 16a, the support is located only on the inner side thereof. Thus an upwardly-inwardly slanted bracket 51 is attached at its lower end to the inner plate 26a and a substantially horizontal brace 52 is attached to said plate near its upper end. The bracket 51 and brace 52 are brought together and formed with an upward extension 53 to which the lower end of chain 42a is attached. In other respects, the structure of FIGS. 4 and 5 is similar to that of the preceding modification and the same reference numerals followed by subscripts a are used to designate corresponding parts.

As is best shown in FIGS. 3 and 4, the lower end of brackets 37 and 51 are attached to the lower ends of plates 26a adjacent channels 27, 27a and thus the channels support the brackets and improve the strength of the structure, whereas without said channels the frames 16, 16a might tend to be distorted out of shape.

What is claimed is:

1. For use with a vehicle track drive member suitable for attachment to a vehicle wheel drive wall to replace the vehicle wheel and wherein is provided a frame having a normally substantially horizontal bottom, a drive sprocket, idlers and bogie wheels rotatably mounted in said frame and an endless track extending around said sprocket, idlers and bogie wheels, said track having a plurality of sections pivotally connected together, each said section having on either side thereof a lug which protrudes inward on either side of said frame, the improvement which comprises an inverted channel extending longitudinally and having a web, means rigidly connecting said web flush with the underside of said bottom, and flanges on the underside of said web, said flanges disposed immediately inward of the path of travel of said lugs as said track is driven by said sprocket and holding said track sections spaced below said bottom.

2. The improvement of claim 1 wherein each end of each said flange is severed from said web and bent inward, whereby lugs tending to be forced out of normal path of travel are deflected by said ends to the outsides of said webs.

3. The improvement of claim 1 wherein said frame comprises two longitudinal parallel plates, said web connected to the bottom edges of said plates to reinforce said bottom edges.

4. The improvement of claim 1 which further comprises a flexible member, first means for attachment of one end of said flexible member to a fixed position on said vehicle, and second means for attachment of a second end of said flexible member to a position adjacent one end of said frame, whereby said flexible member restrains within fixed limits rotation of said frame about the axis of rotation of said sprocket.

5. The improvement of claim 4 wherein said second means comprises first and second bracket means fixed to opposite sides of said frame and a second flexible member interconnecting said first and second bracket means, said second end of said first-mentioned flexible means connected to said second flexible member.

6. The improvement of claim 5 which further comprises a cross rod spanning the distance between said first and second bracket means and securing said bracket means in fixed spaced relation, said cross rod extending above the path of movement of said track.

7. The improvement of claim 4 wherein each said bracket means comprises a plurality of bracket members fixed to discrete areas of said frame and converging at their upper ends for attachment to said second flexible member, one end of one said bracket member being fixed to said frame adjacent said channel.

8. The improvement of claim 4 which further comprises a bracket fixed to the inward side of said frame and having a substantially vertical upward extension, said second end of said flexible member connected to the upper end of said upward extension.

9. The improvement of claim 4 which further comprises an extendable, resilient tightener cord connected to said flexible member to take up slack in said flexible member.

10. For use with a vehicle track drive member suitable for attachment to a vehicle wheel drive wall to replace the vehicle wheel and wherein is provided a frame, an endless track and drive means for said track rotatably mounted in said frame, the improvement which comprises a flexible member, first means for attachment of one end of said flexible member to a fixed position on said vehicle, and second means for attachment of a second end of said flexible member to a position adjacent one end of said frame, whereby said flexible member restrains within fixed limits rotation of said frame about the axis of rotation of said sprocket, said second means comprising first and second bracket means fixed to opposite sides of said frame and a second flexible member interconnecting said first and second bracket means, said second end of said first-mentioned flexible means connected to said second flexible member.

11. The improvement of claim 10 which further comprises a cross rod spanning the distance between said first and second bracket means and securing said bracket means in fixed spaced relation, said cross rod extending above the path of movement of said track.

12. For use with a vehicle track drive member suitable for attachment to a vehicle wheel drive wall to replace the vehicle wheel and wherein is provided a frame, an endless track and drive means for said track rotatably mounted in said frame, the improvement which comprises a flexible member, first means for attachment of one end of said flexible member to a fixed position on said vehicle, second means for attachment of a second end of said flexible member to a position adjacent one end of said frame, whereby said flexible member restrains within fixed limits rotation of said frame about the axis of rotation of said sprocket, and a bracket fixed to the inward side of said frame and having a substantially vertical upward extension, said second end of said flexible member being connected to the upper end of said upward extension.

13. For use with a vehicle track drive member suitable for attachment to a vehicle wheel drive wall to replace the vehicle wheel and wherein is provided a frame, an endless track and drive means for said track rotatably mounted in said frame, the improvement which comprises a flexible member, first means for attachment of one end of said flexible member to a fixed position on said vehicle, and second means for attachment of a second end of said flexible member to a position adjacent one end of said frame, whereby said flexible member restrains within fixed limits rotation of said frame about the axis of rotation of said sprocket, and an extendable, resilient tightener cord connected to said flexible member to take up slack in said flexible member.

* * * * *